(12) United States Patent
Zhang et al.

(10) Patent No.: US 12,432,027 B2
(45) Date of Patent: Sep. 30, 2025

(54) REFERENCE SIGNALING DESIGN AND CONFIGURATION

(71) Applicant: ZTE Corporation, Guangdong (CN)

(72) Inventors: Chenchen Zhang, Guangdong (CN); Peng Hao, Guangdong (CN); Junfeng Zhang, Guangdong (CN); Wei Gou, Guangdong (CN)

(73) Assignee: ZTE Corporation, Shenzhen (CN)

( * ) Notice: Subject to any disclaimer, the term of this patent is extended or adjusted under 35 U.S.C. 154(b) by 218 days.

(21) Appl. No.: 17/869,554

(22) Filed: Jul. 20, 2022

(65) Prior Publication Data
US 2022/0360399 A1 Nov. 10, 2022

Related U.S. Application Data

(63) Continuation of application No. PCT/CN2020/075375, filed on Feb. 14, 2020.

(51) Int. Cl.
H04L 5/00 (2006.01)
H04W 24/08 (2009.01)
H04W 72/1273 (2023.01)

(52) U.S. Cl.
CPC .......... *H04L 5/0048* (2013.01); *H04W 24/08* (2013.01); *H04W 72/1273* (2013.01)

(58) Field of Classification Search
CPC .... H04B 7/0626; H04B 7/0632; H04B 17/24; H04L 1/0026; H04L 5/0048; H04L 5/005;
(Continued)

(56) References Cited

U.S. PATENT DOCUMENTS 8,903,006 B2 * 12/2014 Ko .................. H04L 1/0027
375/267
12,113,597 B2 * 10/2024 Kim ................. H04L 5/005
(Continued)

FOREIGN PATENT DOCUMENTS

CN 103039026 A 4/2013
CN 108933648 A 12/2018
(Continued)

OTHER PUBLICATIONS

3GPP, "Technical Specification Group Radio Access Network; NR; Physical layer procedures for data (Release 16)," 3GPP TS 38.214 V16.0.0 (Dec. 2019) (147 pages).
(Continued)

Primary Examiner — Wutchung Chu
(74) Attorney, Agent, or Firm — Perkins Coie LLP

(57) ABSTRACT

Methods, systems, and devices related to related to digital wireless communication, and more specifically, to techniques related to triggering transmission of feedback channel state information. In one exemplary aspect, a method for wireless communication is disclosed. The method includes receiving, by a terminal, a first message from a wireless communication node. The method also includes performing, by the terminal, a measurement relating to a channel status. The method also includes transmitting, by the terminal, a feedback message to the wireless communication node that includes information relating to the channel status based on determining that the first message includes an indication to feedback the measurement relating to the channel status.

18 Claims, 4 Drawing Sheets

(58) Field of Classification Search
CPC .... H04L 5/0057; H04W 24/08; H04W 24/10; H04W 72/1273; H04W 72/23; Y02D 30/70

See application file for complete search history.

(56) References Cited

U.S. PATENT DOCUMENTS

| | | | | |
|---|---|---|---|---|
| 2017/0126299 | A1* | 5/2017 | Wei | H04L 5/001 |
| 2018/0324797 | A1* | 11/2018 | Hosseini | H04W 72/23 |
| 2019/0044598 | A1 | 2/2019 | Talarico et al. | |
| 2019/0150183 | A1* | 5/2019 | Aiba | H04W 24/10 370/336 |
| 2019/0215130 | A1* | 7/2019 | Aiba | H04L 5/0057 |
| 2019/0229780 | A1* | 7/2019 | Kim | H04B 7/0643 |
| 2019/0312668 | A1* | 10/2019 | Park | H04L 5/0057 |
| 2019/0349142 | A1* | 11/2019 | Aiba | H04L 1/1819 |
| 2019/0349147 | A1* | 11/2019 | Aiba | H04L 5/0094 |
| 2019/0379431 | A1* | 12/2019 | Park | H04L 27/2613 |
| 2020/0351851 | A1* | 11/2020 | Aiba | H04W 72/23 |
| 2021/0006314 | A1* | 1/2021 | Takeda | H04W 72/535 |
| 2021/0111776 | A1* | 4/2021 | Wu | H04L 5/0057 |
| 2021/0194559 | A1 | 6/2021 | Li et al. | |
| 2021/0282041 | A1 | 9/2021 | Kwak et al. | |
| 2021/0320776 | A1* | 10/2021 | Aiba | H04L 1/0061 |
| 2022/0346086 | A1* | 10/2022 | Aiba | H04L 5/0094 |
| 2022/0386331 | A1* | 12/2022 | Aiba | H04L 1/1854 |
| 2023/0006800 | A1* | 1/2023 | Yokomakura | H04L 5/0057 |

FOREIGN PATENT DOCUMENTS

| | | | | |
|---|---|---|---|---|
| CN | 109716703 | A | 5/2019 | |
| CN | 110768701 | A | 2/2020 | |
| EP | 3309974 | A1 * | 4/2018 | H04B 17/24 |
| KR | 102208125 | B1 * | 1/2021 | H04B 7/0626 |
| WO | WO-2019139995 | A1 * | 7/2019 | H04W 72/042 |
| WO | 2020017240 | A1 | 1/2020 | |
| WO | WO-2020196422 | A1 * | 10/2020 | |
| WO | WO-2020217808 | A1 * | 10/2020 | H04L 1/1812 |
| WO | WO-2021090609 | A1 * | 5/2021 | H04B 7/0626 |
| WO | WO-2021098057 | A1 * | 5/2021 | H04B 17/24 |

OTHER PUBLICATIONS

Extended European Search Report for European Patent Application No. 20890589.3, mailed Dec. 13, 2022 (15 pages).
Interdigital Communications, "Considerations on reference signal design for NR," 3GPP TSG-RAN WG1 Meeting #86, R1-167573, Gothenburg, Sweden, Aug. 2016 (5 pages).
International Search Report and Written Opinion for International Application No. PCT/CN2020/075375, mailed on Nov. 2, 2020 (7 pages).
Office Action for Korean Patent Application No. 10-2022-7026194, mailed Aug. 20, 2024 with English Summary of Office Action (7 pages).
Office Action for Vietnamese Application No. 1-2022-04741, mailed Aug. 30, 2024 with English translation (4 pages).
Communication pursuant to Article 94(3) EPC mailed Jan. 20, 2025 for European Patent Application No. 20 890 589.3, 12 pages.
KIPO, Notice of Final Rejection for Korean Application No. 10-2022-7026194, mailed on Apr. 3, 2025, 5 pages with unofficial English translation.
EPO, Intention to Grant for European Application No. 20 890 589.3, mailed on May 12, 2025, 8 pages.
CNIPA, First Office Action for Chinese Application No. 202080091372.3, mailed on May 29, 2025, 16 pages with unofficial English translation.

* cited by examiner

REFERENCE SIGNALING DESIGN AND CONFIGURATION

CROSS REFERENCE TO RELATED APPLICATIONS

This patent document is a continuation of and claims benefit of priority to International Patent Application No. PCT/CN2020/075375, filed on Feb. 14, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to triggering transmission of feedback channel state information.

In one exemplary aspect, a method for wireless communication is disclosed. The method includes receiving, by a terminal, a first message from a wireless communication node. The method also includes performing, by the terminal, a measurement relating to a channel status. The method also includes transmitting, by the terminal, a feedback message to the wireless communication node that includes information relating to the channel status based on determining that the first message includes at least one indication to feedback the measurement relating to the channel status.

In another exemplary aspect, a method for wireless communication is disclosed. The method includes transmitting, by a wireless communication node, a first message to a terminal, the first message including an indication for the terminal to transmit a feedback message to the wireless communication node. The method also includes receiving, by the wireless communication node, the feedback message from the terminal responsive to transmitting the first message, the feedback message including information relating to a channel status.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for wireless communication, comprising: receiving, by a terminal, a first message from a wireless communication node; performing, by the terminal, a measurement relating to a channel status; and transmitting, by the terminal, a feedback message to the wireless communication node that includes information relating to the channel status based on determining that the first message includes at least one indication to feedback the measurement relating to the channel status.

2. The solution of clause 1, wherein the information relating to the channel status includes a first type of channel state information that is measured based on a channel state information reference signal (CSI-RS) resource.

3. The solution of clause 1, wherein the indication to feedback the information relating to the channel status in the first message includes any of a channel state information (CSI) request field, a cyclic redundancy check (CRC) CRC scrambled by a first Radio Network Temporary Identifier (RNTI), a physical uplink control channel (PUCCH) resource indicator field, a new data indicator field, a redundancy version field, and a priority indicator field.

4. The solution of clause 1, wherein the information relating to the channel status includes a second type of feedback channel state information that is measured based on any of a physical downlink shared channel (PDSCH), a periodic channel state information reference signal (CSI-RS) resource, and a semi-persistent CSI-RS resource.

5. The solution of clause 1, wherein the indication to feedback the information relating to the channel status in the first message includes any of a field that indicates a triggering type in the first message and a field in the first message that indicates a status of triggering the second type of information relating to the channel status and a field in the first message that indicates a status of triggering the first type of information relating to the channel status.

6. The solution of clause 1, wherein the first message includes at least one of a first downlink control information (DCI) identified in a user equipment (UE) specific search space that is used for scheduling or activating a downlink transmission, a second DCI identified in the UE specific search space that is used for scheduling or activating an uplink transmission, and a third DCI identified in a group-common search space.

7. The solution of any of clauses 1, 2, and 4, further comprising: determining, by the terminal, whether the first message includes an indication to trigger any of the first type of information relating to the channel status or the second type of information relating to the channel status.

8. The solution of clause 1, wherein the indication to feedback the information relating to the channel status includes a decoding result of a downlink transmission indicative of whether to include the information relating to the channel status in the feedback message.

9. The solution of clause 8, wherein the decoding result identified by the terminal is indicative of a negative acknowledgement (NACK) that identifies an unsuccessful decoding of a downlink transmission, and wherein the downlink transmission is a transmission in PDSCH scheduled or activated by the first message.

10. The solution of clause 1, further comprising: determining, by the terminal, that a first indication field of the first message includes a bit string with any bit reading a non-zero value, wherein the bit string with any bit reading a non-zero value of the first indication field is indicative of a first type of trigger state, wherein the indication of the first type of trigger state triggers feedback the first type of information relating to the channel status.

11. The solution of clause 10, further comprising: receiving, by the terminal, a radio resource control (RRC) message from the wireless communication node, wherein the first type of trigger state is configured by the wireless communication node via the RRC message.

12. The solution of clause 1, further comprising: determining, by the terminal, that a first indication field of the first message includes a bit string with any bit reading a non-zero value, wherein the bit string with any bit reading a non-zero value of the first indication field is indicative of a second type of trigger state, wherein the indication of the second type of trigger state triggers the second type of information relating to the channel status.

13. The solution of clause 12, further comprising: receiving, by the terminal, an RRC message from the wireless communication node, wherein the second type of trigger state is configured by the wireless communication node via the RRC message.

14. The solution of clause 1, wherein the indication to feedback the information relating to the channel status includes identifying a CSI measurement type, wherein the CSI measurement type includes at least one of a first type of triggering that indicates a first type of CSI measurement is to be performed and a second type of triggering that indicates a second type of CSI measurement is to be performed.

15. The solution of clause 1, wherein if the first type of triggering is identified in the first message, the terminal prepares a first format for the information relating to the channel status, the first format is included in the feedback message.

16. The solution of clause 1, wherein if the second type of triggering is identified in the first message, the terminal prepares a second format for the information relating to the channel status, wherein the second format is included in the feedback message.

17. The solution of clause 16, wherein the second format for CSI feedback includes at least one of: at least one sub-band channel quality indicator (CQI) for a first frequency domain scope, a wideband CQI for the first frequency domain scope, at least one difference value between the at least one sub-band CQI and a last value indicative of a CQI of a previous feedback for the first frequency domain scope, at least one difference value between the at least one sub-band CQI and a value in the first message indicative of the first frequency domain scope, and at least one difference value between the at least one sub-band CQI and the wideband CQI for the first frequency domain scope.

18. The solution of clause 16, wherein the first frequency domain scope is determined at least one of: pre-defined, configured by the wireless communication node via RRC signaling, a frequency resource for a downlink transmission scheduled by the first message, a frequency resource for a downlink transmission activated by the first message, a frequency resource for a semi-persistent scheduling (SPS) physical downlink shared channel (PDSCH) transmission.

19. The solution of clause 1, wherein determining that the first message includes the indication to feedback the information relating to the channel status includes identifying one or more fields in the first message that trigger the feedback message for one or more groups of terminals.

20. The solution of clause 1, further comprising: receiving, by the terminal, an offset from the wireless communication node that is indicative of a first field or a first starting bit to read in the first message of the one or more fields in the first message.

21. The solution of clause 8, wherein the indication to feedback the information relating to the channel status includes the decoding result of the downlink transmission after a first number of repeats.

22. The solution of clause 21, wherein the first number of repeats includes at least one of a value equaling one, a total number of repeats configured by the wireless communication node through RRC signaling, and a value in a scope ranging between 1 and the total number of repeats configured by the wireless communication node through RRC signaling.

23. A solution for wireless communication, comprising: transmitting, by a wireless communication node, a first message to a terminal, the first message including at least one indication for the terminal to transmit a feedback message to the wireless communication node; and receiving, by the wireless communication node, the feedback message from the terminal responsive to transmitting the first message, the feedback message including information relating to a channel status.

24. The solution of clause 23, wherein the information relating to the channel status includes a first type of channel state information that is measured based on a channel state information reference signal (CSI-RS) resource.

25. The solution of clause 23, wherein the indication for the terminal to transmit a feedback message to the wireless communication node in the first message includes any of a channel state information (CSI) request field, a cyclic redundancy check (CRC) CRC scrambled by a first Radio Network Temporary Identifier (RNTI), a physical uplink control channel (PUCCH) resource indicator field, a new data indicator field, a redundancy version field, and a priority indicator field.

26. The solution of clause 23, wherein the information relating to the channel status includes a second type of feedback channel state information that is measured based on any of a physical downlink shared channel (PDSCH), a periodic channel state information reference signal (CSI-RS) resource, and a semi-persistent CSI-RS resource.

27. The solution of clause 23, wherein the indication to feedback the information relating to the channel status in the first message includes any of a field that indicates a triggering type in the first message and a field in the first message that indicates a status of triggering the second type of information relating to the channel status and a field in the first message that indicates a status of triggering the first type of information relating to the channel status.

28. The solution of clause 23, wherein the first message includes at least one of a first downlink control information (DCI) identified in a user equipment (UE) specific search space that is used for scheduling or activating a downlink transmission, a second DCI identified in the UE specific search space that is used for scheduling or activating an uplink transmission, and a third DCI identified in a group-common search space.

29. The solution of clause 23, wherein the indication to feedback the information relating to the channel status includes a decoding result of a downlink transmission indicative of whether to include the information relating to the channel status in the feedback message.

30. The solution of clause 29, wherein the decoding result identified by the terminal is indicative of a negative acknowledgement (NACK) that identifies an unsuccessful decoding of a downlink transmission, and wherein the downlink transmission is a transmission in PDSCH scheduled or activated by the first message.

31. The solution of clause 23, wherein a first indication field of the first message includes a bit string with any bit reading a non-zero value that is indicative of a first type of trigger state, wherein the indication of the first type of trigger state triggers feedback the first type of information relating to the channel status.

32. The solution of clause 31, further comprising: transmitting, by the wireless communication node, a radio resource control (RRC) message to the terminal, wherein the first type of trigger state is configured by the wireless communication node via the RRC message.

33. The solution of clause 23, wherein a first indication field of the first message includes a bit string with any bit reading a non-zero value that is indicative of a second type of trigger state, wherein the indication of the second type of trigger state triggers the second type of information relating to the channel status.

34. The solution of clause 33, further comprising: transmitting, by the wireless communication node, an RRC message to the terminal, wherein the second type of trigger state is configured by the wireless communication node via the RRC message.

35. The solution of clause 23, wherein the indication for the terminal to transmit a feedback message to the wireless communication node includes a CSI measurement type, wherein the CSI measurement type includes at least one of a first type of triggering that indicates a first type of CSI measurement is to be performed and a second type of triggering that indicates a second type of CSI measurement is to be performed.

36. The solution of clause 23, wherein if the first type of triggering is identified in the first message, the terminal is configured to prepare a first format for the information relating to the channel status, wherein the first format is included in the feedback message.

37. The solution of clause 23, wherein if the second type of triggering is identified in the first message, the terminal prepares a second format for the information relating to the channel status, wherein the second format is included in the feedback message.

38. The solution of clause 37, wherein the second format for CSI feedback includes at least one of: at least one sub-band channel quality indicator (CQI) for a first frequency domain scope, a wideband CQI for the first frequency domain scope, at least one difference value between the at least one sub-band CQI and a last value indicative of a CQI of a previous feedback for the first frequency domain scope, at least one difference value between the at least one sub-band CQI and a value in the first message indicative of the first frequency domain scope, and at least one difference value between the at least one sub-band CQI and the wideband CQI for the first frequency domain scope.

39. The solution of clause 37, wherein the first frequency domain scope is determined at least one of: pre-defined, configured by the wireless communication node via RRC signaling, a frequency resource for a downlink transmission scheduled by the first message, a frequency resource for a downlink transmission activated by the first message, a frequency resource for a semi-persistent scheduling (SPS) physical downlink shared channel (PDSCH) transmission.

40. The solution of clause 23, further comprising: transmitting, by the wireless communication node, an offset to the terminal that is indicative of a first field or a first starting bit to read in the first message of the one or more fields in the first message.

41. The solution of clause 29, wherein the indication to feedback the information relating to the channel status includes the decoding result of the downlink transmission after a first number of repeats.

42. The solution of clause 41, wherein the first number of repeats includes at least one of a value equaling one, a total number of repeats configured by the wireless communication node through RRC signaling, and a value in a scope ranging between 1 and the total number of repeats configured by the wireless communication node through RRC signaling.

43. An apparatus for wireless communication comprising a processor that is configured to carry out the solution of any of clauses 1 to 42.

44. A non-transitory computer readable medium having code stored thereon, the code when executed by a processor, causing the processor to implement a solution recited in any of clauses 1 to 42.

The details of one or more implementations are set forth in the accompanying attachments, the drawings, and the description below. Other features will be apparent from the description and drawings, and from the claims.

DETAILED DESCRIPTION

Figure 1:
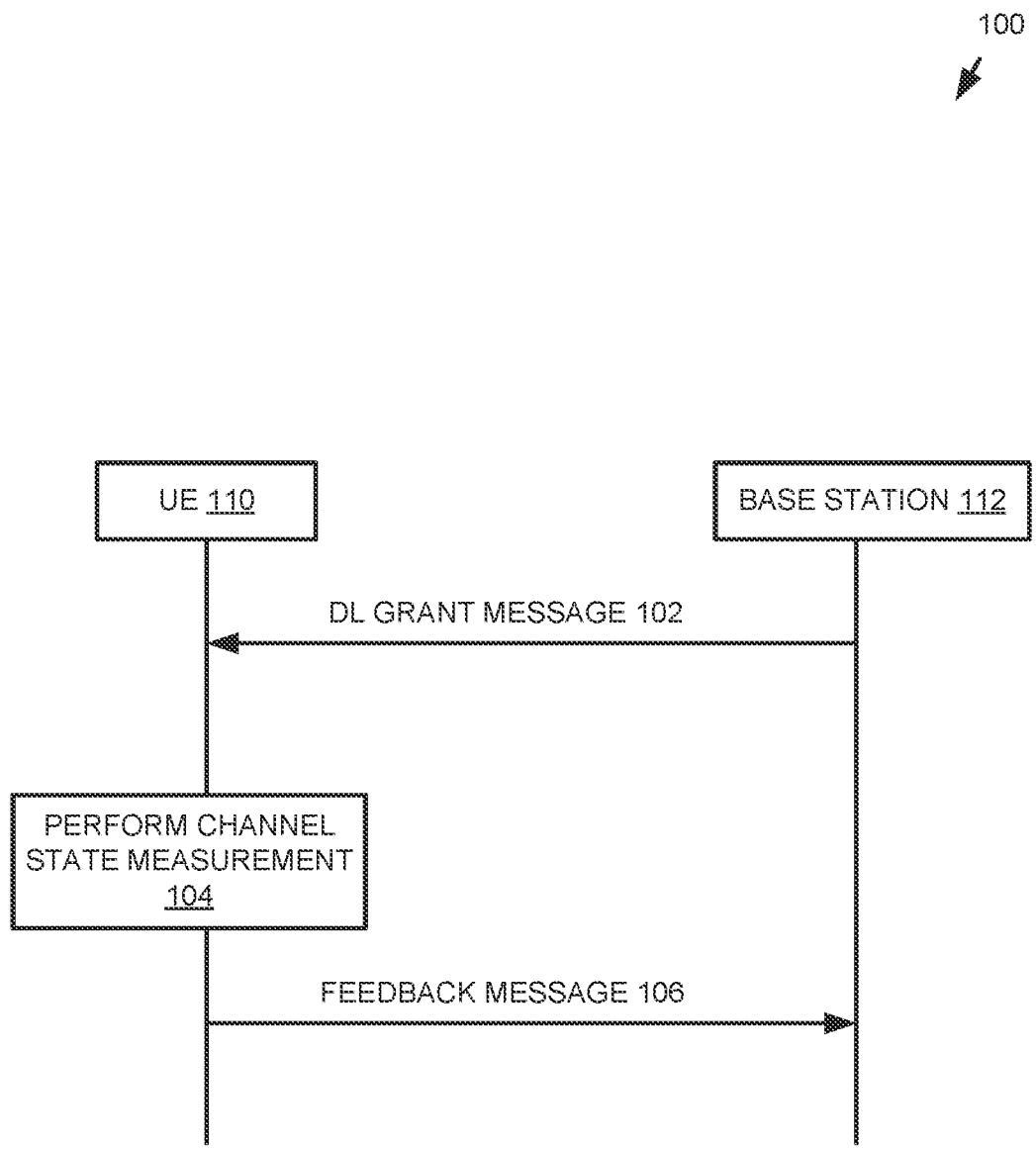
FIG. 1 is a block diagram of an example signaling process for triggering feedback information.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Many networks have low latency and high reliability requirements in providing wireless communications (e.g., Ultra Reliable Low Latency Communications (URLLC)). In many cases, a terminal (or "user equipment (UE)") may feedback accurate and timely channel state information to a base station so that the base station can perform reasonable link adaptations tasks to ensure that wireless communications are in accordance with the low latency and high reliability requirements.

In some cases, feedback aperiodic channel state information can only be triggered by a physical downlink control channel (PDCCH) carrying an uplink (UL) Grant. Feedback may be performed on a physical uplink shared channel (PUSCH) scheduled by the UL Grant. In these cases, if there is no UL SCH to send, the base station has to send a PDCCH carrying a UL Grant in order to trigger aperiodic channel state feedback. This may cause PDCCH blocking.

Accordingly, in many cases, it has been proposed that the PDCCH carrying a downlink (DL) Grant can be used to trigger aperiodic channel state information feedback, and the DL Grant can schedule PDSCH at the same time. This may trigger aperiodic channel state information feedback. This may occur when the base station needs to schedule PDSCH and the terminal needs feedback channel state information. In some embodiment, when the base station has a scheduled PDSCH that requests the terminal to provide channel state information, the DL Grant can be used to trigger aperiodic channel state information feedback.

In many cases, it may be proposed that after the terminal decodes the PDSCH transport block (TB), and the result is unsuccessful decoding, i.e. the HARQ-ACK feedback is NACK, it can trigger the feedback of aperiodic channel state information, so that the aperiodic channel state information fed back can be applied to the retransmission link adaptation of the PDSCH TB.

The terminal decoding a subsequent PDSCH may result in a ACK or NACK generated for the PDSCH in the HARQ-ACK feedback, and the terminal may feedback HARQ-ACK feedback carried on a PUCCH to the base station. For a PUCCH that includes a plurality of PDSCH of HARQ-ACK feedback, NR may introduce a semi-static HARQ-ACK codebook and dynamic HARQ-ACK codebook. In some instances, HARQ-ACK feedback can be transmitted in a slot, where the slot is indicated by K1 in the last DCI. The HARQ-ACK feedback can be carried in a PUCCH resource, where the PUCCH resource is indicated by the PM in the last DCI, wherein a offset between the slot where the DCI is located and the slot where the PUCCH is located is indicated by K1, and the PUCCH resource index is indicated by PRI.

For a dynamic HARQ codebook method, the base station can carry HARQ-ACK feedback for multiple PDSCHs in a certain slot indicated by K1 and PRI in last DCI. This can be sent on PUCCH Resource, where K1 can indicate the offset between the slot where the DCI is located and the slot where the PUCCH is located, and PRI can indicate the PUCCH resource index.

By the DL Grant and PDSCH TB decoding result to trigger aperiodic channel state information feedback, specific issues may arise. For example, by adopting the method in this article, the feedback of aperiodic channel state information can be quickly triggered by the base station independently or assisted by the terminal, so that the base station can obtain updated channel state information as soon as possible for better link adaptation.

System Overview

The present embodiments relate triggering the terminal to feedback channel state information. Particularly, the present embodiments provide methods to trigger accurate and timely feedback of channel state information.

Example Embodiment 1

A first case may relate to how to trigger A-CSI feedback using two trigger types. The terminal is predefined by system or semi-statically configured by the base station through RRC signaling as described herein can support at least one of two types of A-CSI measurement feedback.

The first type of A-CSI feedback can be measured based on aperiodic CSI-RS Resource, periodic CSI-RS Resource, or semi-persistent CSI-RS Resource, and the first type of A-CSI can be fed back to the base station according to the measurement result. The base station can trigger aperiodic CSI-RS Resource while triggering the first type of A-CSI feedback.

FIG. 1 is a block diagram of an example signaling process 100 for triggering feedback information. As shown in FIG. 1, a base station 112 (or "wireless communication node") can transmit a DL grant message 102 (or simply a "first message") to the terminal 110. The DL grant message 102 can include an indication to trigger transmission of feedback information by the terminal (or "User Equipment (UE)").

The UE 110 can perform a channel status measurement 104 to derive channel measurement information of a channel. For example, this can include deriving a A-CSI.

In some instances, the performing of the channel status measurement by the UE can be performed responsive to receiving the DL grant message. In other instances, the performing of the channel status measurement by the UE can be performed independent to the reception of the DL grant message.

The UE 110 can transmit a feedback message 106 to the base station 112. The feedback message 106 can include the channel status measurement (e.g., A-CSI feedback information).

In some embodiments, the terminal can determine whether the first type of A-CSI feedback is triggered according to an instruction of the DL Grant. If a periodic CSI-RS resource or semi-persistent CSI-RS resource is available for measuring CSI, the base station may not trigger aperiodic CSI-RS resource while triggering the first type of A-CSI feedback. If there is no periodic CSI-RS resource or semi-persistent CSI-RS resource used to measure CSI, the base station can trigger an aperiodic CSI-RS Resource.

A second type of A-CSI feedback can be measured based on PDSCH, periodic CSI-RS Resource, or semi-persistent CSI-RS Resource, and the second type of A-CSI can be fed back to the base station according to the measurement results. The base station may not trigger aperiodic CSI-RS Resource while triggering the second type of A-CSI feedback.

The terminal may determine whether the trigger a second type A-CSI feedback according to the DL Grant indication and/or the PDSCH decoding result, the PDSCH is scheduled or activated by the DL Grant. If the DL Grant triggers the second type of A-CSI feedback, and the terminal decodes the PDSCH scheduled or activated by the DL Grant as NACK, i.e. the result of decoding is unsuccessful decoding, the second type of A-CSI feedback may be triggered.

In particular, if the periodic CSI-RS Resource or the semi-persistent CSI-RS Resource used to measure the CSI, the terminal may measure the CSI according to the periodic CSI-RS Resource or the semi-persistent CSI-RS Resource and provide that information to the base station as the second type feedback A-CSI. Or the base station may obtain the second feedback type A-CSI via a PDSCH. In particular, the PDSCH may be a second type of trigger A-CSI of the DL Grant scheduling or active PDSCH.

The base station may dynamically indicate in the DL Grant whether to trigger A-CSI feedback, and may specifically trigger the first type A-CSI feedback or the second type A-CSI feedback.

In a first method, only the CSI request field may be added to the DL grant. If the CSI request field includes a bit field where each bit is "0," it may indicate not to trigger A-CSI feedback. If the CSI request field includes the bit field with any bits not equal to "0," it may indicate to trigger A-CSI feedback, and it may be determined whether to trigger the first type A-CSI feedback or the second type A-CSI feedback according to the trigger status value indicated by the CSI Request field.

A trigger state value may be within the first range, corresponding to triggering the first type of A-CSI feedback. The triggering state value may be within the second range, corresponding to triggering the second type of A-CSI feedback. The trigger state in the first range and the trigger state in the second range may be semi-statically configured by the base station to the terminal through RRC signaling. For example, the base station can configure a A-CSI type indicator field in the configuration of a trigger state through RRC signaling, and the A-CSI type indicator field can indicate this trigger state can trigger one of the first type of A-CSI feedback and the second type of A-CSI feedback.

In a second method, including a CSI request field and a triggering type indication in the DL grant, and the triggering type indication can be 1 or 2 bits. If the CSI request field includes a bit string where each bit is "0", it may indicate to not trigger any A-CSI feedback. If the CSI request field includes the bit string with any bits not equal to "0", it may indicate to trigger A-CSI feedback. The triggering type indication may be used to determine which type of A-CSI feedback to be utilized for the triggering.

In a third method, including a CSI request field and a A-CSI triggering indication of the second type of triggering in the DL grant, and the A-CSI triggering indication of the second type of triggering can be 1 or 2 bits. The CSI request field may be used to indicate whether the first type of A-CSI feedback is triggered and according to the triggering state value. The A-CSI triggering indication of the second type of triggering may indicate whether triggering the second type of A-CSI feedback. For example, if the A-CSI triggering indication of the second type of triggering indicates '0' value, which means not any the second type of triggering is triggered, if the A-CSI triggering indication of the second type of triggering indicates '1' value, which means a second type of trigging is triggered, so the second type of feedback should be transmitted by the terminal.

In a fourth method, only a CSI request field may be added to the DL grant. If the CSI request includes the bit string with all bits equal to "0", it may indicate to not trigger a first type A-CSI feedback and trigger the second type A-CSI feedback. If the CQI request includes the bit string with any bit not equals to "0", it may trigger a first type A-CSI feedback and not trigger a second type A-CSI feedback.

Different A-CSI Report formats can be predefined by the system or semi statically configured by the base station through RRC signaling, and the different A-CSI Report formats can include different channel state information corresponding to the first type of A-CSI feedback and the second type of A-CSI feedback.

The second type of A-CSI feedback may include any of: at least one sub-band channel quality indicator (CQI) for a first frequency domain scope, a wideband CQI for the first frequency domain scope, at least one difference value between the at least one sub-band CQI and a last value indicative of a CQI of a previous feedback for the first frequency domain scope, at least one difference value between the at least one sub-band CQI and a value in the first message indicative of the first frequency domain scope, and at least one difference value between the at least one sub-band CQI and the wideband CQI for the first frequency domain scope.

The first frequency range may include any of frequency domain resources occupied by PDSCH scheduled or activated by triggering the DL grant of the second type of A-CSI, and frequency domain resources predefined by the system or semi-statically configured by the base station, and the frequency domain resources of a SPS-PDSCH, which can be activated by the triggering DL grant, or other DL grant.

Example Embodiment 2

The second example embodiment may relate to how to trigger A-CSI feedback that utilizes a specific RNTI. The system may be pre-defined or the base station may semi-statically configure an RNTI, which may be referred to as a first RNTI.

When a UE receives a DL Grant or a UL Grant in a DCI with CRC scrambled by the first RNTI, the UE may be triggered an A-CSI feedback, the UE feedback the A-CSI in PUCCH, or PUSCH. When a UE received a DL Grant or a UL Grant in a DCI with CRC scrambled by the other RNTI, the UE may not be triggered by any A-CSI feedback.

Example Embodiment 3

The third example may relate to how to trigger A-CSI feedback using a specific PRI.

The PUCCH Resource may be split into a first PUCCH Resource and a second PUCCH Resource. System pre-defined or the base station semi-statically configures some of the PUCCH Resources as the first PUCCH Resource, and the system pre-defined or the base station semi-statically configures some other PUCCH Resources as the second PUCCH Resource.

After receiving the DL Grant, the terminal may read the PUCCH resource indicator field in the DL Grant. If the PUCCH Resource indicated by this field is the first PUCCH Resource, it may indicate that the DL Grant triggers A-CSI feedback. If the PUCCH Resource indicated by this field is the second PUCCH Resource, it may indicate that the DL Grant does not trigger A-CSI feedback.

If the terminal confirms that the DL Grant triggers A-CSI feedback through the PUCCH resource indicator field, the terminal can send A-CSI feedback on the PUCCH Resource indicated by the PUCCH resource indicator field. Specifically, the terminal may multiplex A-CSI and HARQ ACK on the PUCCH Resource and feed it back to the base station.

If the base station configures the terminal to feedback HARQ-ACK based on a HARQ-ACK codebook, the terminal may send A-CSI on the PUCCH Resource indicated by the PUCCH resource indicator field of the last DCI.

A HARQ-ACK codebook can include one or multiple HARQ-ACK for one or multiple PDSCH transmissions, the last DCI is the DL grant scheduling or activating the last PDSCH transmission. If the terminal confirms through the PUCCH resource indicator field that the DL Grant does not trigger A-CSI feedback, the terminal may send HARQ-ACK feedback only on the PUCCH Resource indicated by the PUCCH resource indicator field. Here, the DL Grant can be the last DCI or the DCI received by the terminal before the last DCI.

Example Embodiment 4

A fourth example embodiment may relate to how to trigger A-CSI feedback using a field in the DL grant. After receiving the DL Grant for scheduling PDSCH, the terminal may determine whether the base station triggers A-CSI feedback according to the system's predefined or semi-static configuration of the base station and the value of one or more of the below fields in the DL Grant. Examples of such fields in the DL grant can include a new data indicator field in DL Grant, a Redundancy version field in DL Grant, or a Priority indicator field in DL Grant.

Specifically, the terminal may determine whether the current DL Grant triggers A-CSI feedback according to an indication of whether the current DL Grant triggers A-CSI feedback according to whether the NDI field has reversed. Specifically, it may be that the NDI field does not reverse and indicate that the current DL Grant triggers A-CSI feedback. If the RV field indicates a specific value, it means that the current DL Grant may trigger A-CSI feedback, and the specific value is predefined by the system or configured by the base station to the terminal through RRC signaling.

If the Priority indicator field indicates a specific value, it may indicate that the current DL Grant can trigger A-CSI feedback, and the specific value may be predefined by the system or configured by the base station to the terminal through RRC signaling. Specifically, if the Priority indicator field indicates a high priority, it can indicate that the current DL Grant triggers A-CSI feedback. If the terminal determines that the DL Grant triggers A-CSI feedback according to the above manner, the terminal can provide A-CSI feedback on the PUCCH or PUSCH.

Example Embodiment 5

A fifth example embodiment may relate to how to trigger A-CSI feedback using a group-common PDCCH. The base station may use the group-common PDCCH DCI to instruct the terminal to trigger A-CSI feedback. Specifically, using DCI format 2_0, DCI format the 2_1, DCI format 2_2, DCI format 2_3, or DCI format 2_4, one kind of DCI format can be used to transmit trigger A-CSI indication feedback, which may be predefined by the system, or a new DCI format can be predefined to indicate triggering A-CSI feedback.

In the group-common PDCCH DCI that triggers A-CSI feedback, multiple A-CSI trigger fields may be included and each A-CSI trigger field may indicate the A-CSI trigger of a specific user or user group. For each user or user group, a field offset or bit offset can be configured semi-statically by the base station through RRC signaling. The field offset can indicate which field to read for this user or user group. The bit offset can indicate from which bit to read for this user or user group.

Example Embodiment 6

A sixth example embodiment may relate to how to trigger A-CSI feedback using DL grant and NACK. The base station can configure the terminal through RRC signaling to perform repeated transmission of PDSCH with a repetition factor of K. In particular, for a DL Grant scheduling a PDSCH or DL Grant activation of the SPS, a PDSCH can be continuously transmitted by K times over one or more time units, the time unit may be a slot or sub slot or several OFDM symbols.

If whether triggering A-CSI feedback is based on the decoding result of a PDSCH transmission, and the base station can configure the repetition factor of the PDSCH transmission as K, after receiving a first value of times of repetition transmission, if the decoding result is unsuccessful, i.e. the feedback for the PDSCH transmission is NACK, the terminal is triggered A-CSI feedback, and for determining the first value, which can be pre-defined or indicated by the base station through a DCI or configured by the base station through a MAC CE or configured by the base station through RRC signaling.

A first method may include the terminal determining whether to trigger A-CSI feedback according to the first transmission of the K repeated transmissions. Particularly, the terminal may receive the first transmission within the K repeated transmissions, and determines whether the decoding result is NACK, the A-CSI feedback may be triggered, and the terminal can transmit the A-CSI feedback.

After receiving all transmissions of K repeated transmissions, the terminal can determine whether to trigger A-CSI feedback according to the final decoding result. Specifically, if the terminal determines that the final decoding result after N repeated transmissions is NACK, the terminal may consider that A has been triggered. The terminal can then perform A-CSI feedback.

The base station may instruct the terminal using RRC signaling or MAC CE or DCI to determine whether to trigger A-CSI feedback according to the decoding result after the first m repeated transmissions. The m repeated transmission may include any integer between 1 and K. Particularly, if the terminal determines that the decoding result after m repeated transmissions is NACK, the terminal may determine that A-CSI feedback is triggered, and the terminal may perform A-CSI feedback.

Specifically, if some transmission of the K repeated transmissions are not received, the terminal can determine that A-CSI feedback is triggered, and the terminal may not receive the remaining repeated transmissions.

Accordingly, if the terminal, according to the first transmission of the K repeats, determines whether to trigger A-CSI feedback, the terminal can consider the time unit where the first transmission is received or the time unit receiving DL Grant to be the time unit where A-CSI feedback is triggered. The time unit may include a slot or a sub slot or an OFDM symbol. If the time unit is an OFDM symbol, it specifically can refer to the end symbol of the terminal receiving the first transmission or the end symbol of the terminal receiving the DL Grant.

If the terminal determines whether to trigger A-CSI feedback according to all transmissions of K repeated transmissions, then the terminal can determine that the time unit where the Kth transmission is received or the time unit receiving the DL Grant is the time unit where A-CSI feedback is triggered. The time unit may be a slot or a sub slot or an OFDM symbol. If the time unit is an OFDM symbol, it can specifically refer to the end symbol of the terminal receiving the first transmission or the end symbol of the terminal receiving the DL Grant.

If the terminal determines whether to trigger A-CSI feedback according to the first m transmissions in K repeated transmissions, the terminal may determine that the time unit in which the m-th transmission is received or the time unit that receiving the DL Grant is the time unit where A-CSI feedback is triggered. The time unit may include a slot or a sub slot or an OFDM symbol. If the time unit is an OFDM symbol, it can specifically refer to the end symbol of the terminal receiving the first transmission or the end symbol of the terminal receiving the DL Grant.

Figure 2:
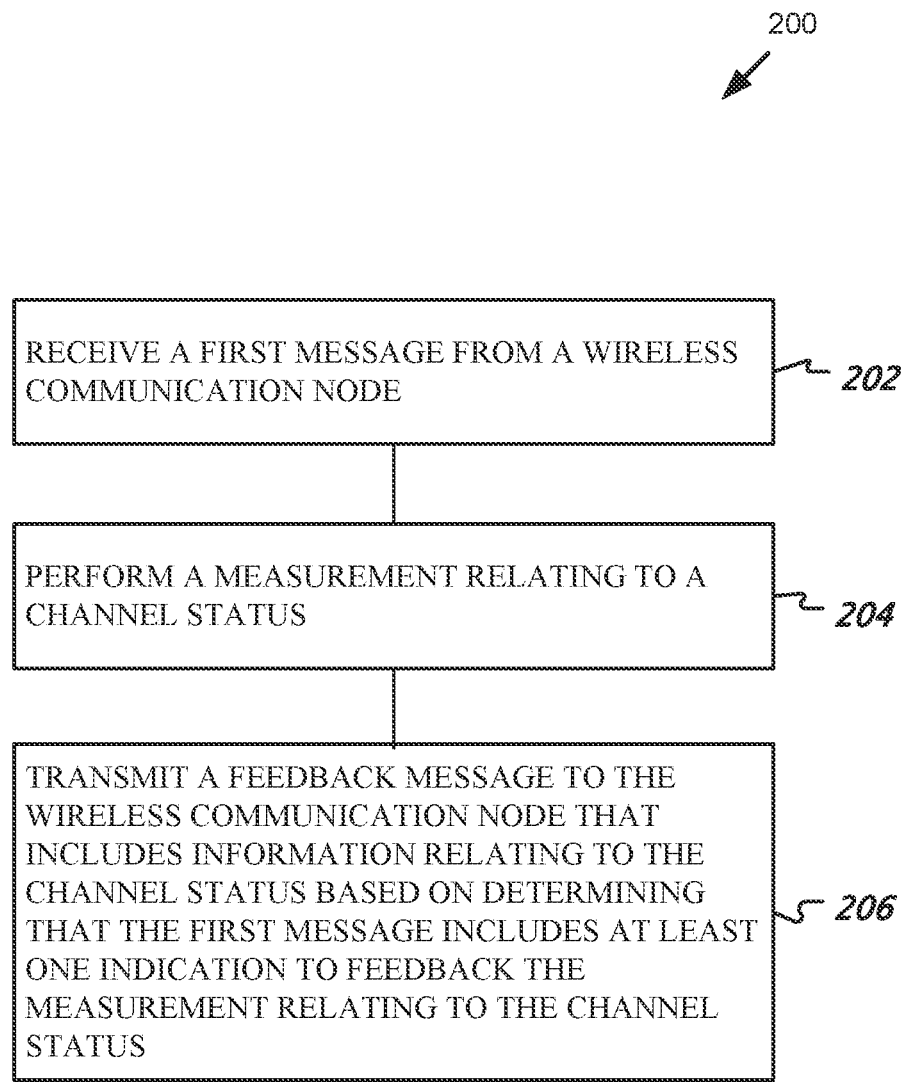
FIG. 2 is a block diagram of an example method for triggering transmission of feedback channel state information.

FIG. 2 is a block diagram of an example method 200 for triggering transmission of feedback channel state information. The method may include receiving a first message from a wireless communication node (block 202). The first message can include the DL grant message, such as DL grant message 102 as described with respect to FIG. 1.

The method may also include performing a measurement relating to a channel status (block 204). This can include performing a A-CSI feedback measurement, as described herein. Performance of the measurement relating to the channel status can be performed either prior to or responsive to the transmission of the first message.

The method may also include transmitting, by the terminal, a feedback message to the wireless communication node that includes the measurement relating to the channel status based on determining that the first message includes an indication to feedback the measurement relating to the channel status (block 206). The feedback message can include A-CSI measurement feedback information to the base station.

In some embodiments, wherein the information relating to the channel status includes a first type of channel state information that is measured based on a channel state information reference signal (CSI-RS) resource.

In some embodiments, the indication to feedback the information relating to the channel status in the first message includes any of a channel state information (CSI) request field, a cyclic redundancy check (CRC) CRC scrambled by a first Radio Network Temporary Identifier (RNTI), a physical uplink control channel (PUCCH) resource indicator field, a new data indicator field, a redundancy version field, and a priority indicator field.

In some embodiments, the information relating to the channel status includes a second type of feedback channel state information that is measured based on any of a physical downlink shared channel (PDSCH), a periodic channel state information reference signal (CSI-RS) resource, and a semi-persistent CSI-RS resource.

In some embodiments, the indication to feedback the information relating to the channel status in the first message includes any of a field that indicates a triggering type in the first message and a field in the first message that indicates a status of triggering the second type of information relating to the channel status and a field in the first message that indicates a status of triggering the first type of information relating to the channel status.

In some embodiments, the first message includes at least one of a first downlink control information (DCI) identified in a user equipment (UE) specific search space that is used for scheduling or activating a downlink transmission, a second DCI identified in the UE specific search space that is used for scheduling or activating an uplink transmission, and a third DCI identified in a group-common search space.

In some embodiments, the method includes determining, by the terminal, whether the first message includes an indication to trigger any of the first type of information relating to the channel status or the second type of information relating to the channel status.

In some embodiments, the indication to feedback the information relating to the channel status includes a decoding result of a downlink transmission indicative of whether to include the information relating to the channel status in the feedback message.

In some embodiments, the decoding result identified by the terminal is indicative of a negative acknowledgement (NACK) that identifies an unsuccessful decoding of a downlink transmission, and wherein the downlink transmission is a transmission in PDSCH scheduled or activated by the first message.

In some embodiments, the method includes determining, by the terminal, that a first indication field of the first message includes a bit string with any bit reading a non-zero value, wherein the bit string with any bit reading a non-zero value of the first indication field is indicative of a first type of trigger state, wherein the indication of the first type of trigger state triggers feedback the first type of information relating to the channel status.

In some embodiments, the method includes receiving, by the terminal, a radio resource control (RRC) message from the wireless communication node, wherein the first type of trigger state is configured by the wireless communication node via the RRC message.

In some embodiments, the method includes determining, by the terminal, that a first indication field of the first message includes a bit string with any bit reading a non-zero value, wherein the bit string with any bit reading a non-zero value of the first indication field is indicative of a second type of trigger state, wherein the indication of the second type of trigger state triggers the second type of information relating to the channel status.

In some embodiments, the method includes receiving, by the terminal, an RRC message from the wireless communication node, wherein the second type of trigger state is configured by the wireless communication node via the RRC message.

In some embodiments, the indication to feedback the information relating to the channel status includes identifying a CSI measurement type, wherein the CSI measurement type includes at least one of a first type of triggering that indicates a first type of CSI measurement is to be performed and a second type of triggering that indicates a second type of CSI measurement is to be performed.

In some embodiments, if the first type of triggering is identified in the first message, the terminal prepares a first format for the information relating to the channel status, the first format is included in the feedback message.

In some embodiments, if the second type of triggering is identified in the first message, the terminal prepares a second format for the information relating to the channel status, wherein the second format is included in the feedback message.

In some embodiments, the second format for CSI feedback includes at least one of: at least one sub-band channel quality indicator (CQI) for a first frequency domain scope, a wideband CQI for the first frequency domain scope, at least one difference value between the at least one sub-band CQI and a last value indicative of a CQI of a previous feedback for the first frequency domain scope, at least one difference value between the at least one sub-band CQI and a value in the first message indicative of the first frequency domain scope, and at least one difference value between the at least one sub-band CQI and the wideband CQI for the first frequency domain scope.

In some embodiments, the first frequency domain scope is determined at least one of: pre-defined, configured by the wireless communication node via RRC signaling, a frequency resource for a downlink transmission scheduled by the first message, a frequency resource for a downlink transmission activated by the first message, a frequency resource for a semi-persistent scheduling (SPS) physical downlink shared channel (PDSCH) transmission.

In some embodiments, determining that the first message includes the indication to feedback the information relating to the channel status includes identifying one or more fields in the first message that trigger the feedback message for one or more groups of terminals.

In some embodiments, the method includes receiving, by the terminal, an offset from the wireless communication node that is indicative of a first field or a first starting bit to read in the first message of the one or more fields in the first message.

In some embodiments, the indication to feedback the information relating to the channel status includes the decoding result of the downlink transmission after a first number of repeats.

In some embodiments, the first number of repeats includes at least one of a value equaling one, a total number of repeats configured by the wireless communication node through RRC signaling, and a value in a scope ranging between 1 and the total number of repeats configured by the wireless communication node through RRC signaling.

In another example embodiment, a for wireless communication comprises transmitting, by a wireless communication node, a first message to a terminal, the first message including at least one indication for the terminal to transmit a feedback message to the wireless communication node; and receiving, by the wireless communication node, the feedback message from the terminal responsive to transmitting the first message, the feedback message including information relating to a channel status.

In some embodiments, the information relating to the channel status includes a first type of channel state information that is measured based on a channel state information reference signal (CSI-RS) resource.

In some embodiments, the indication for the terminal to transmit a feedback message to the wireless communication node in the first message includes any of a channel state information (CSI) request field, a cyclic redundancy check (CRC) CRC scrambled by a first Radio Network Temporary Identifier (RNTI), a physical uplink control channel (PUCCH) resource indicator field, a new data indicator field, a redundancy version field, and a priority indicator field.

In some embodiments, the information relating to the channel status includes a second type of feedback channel state information that is measured based on any of a physical downlink shared channel (PDSCH), a periodic channel state information reference signal (CSI-RS) resource, and a semi-persistent CSI-RS resource.

In some embodiments, the indication to feedback the information relating to the channel status in the first message includes any of a field that indicates a triggering type in the first message and a field in the first message that indicates a status of triggering the second type of information relating to the channel status and a field in the first message that indicates a status of triggering the first type of information relating to the channel status.

In some embodiments, the first message includes at least one of a first downlink control information (DCI) identified in a user equipment (UE) specific search space that is used for scheduling or activating a downlink transmission, a second DCI identified in the UE specific search space that is used for scheduling or activating an uplink transmission, and a third DCI identified in a group-common search space.

In some embodiments, the indication to feedback the information relating to the channel status includes a decoding result of a downlink transmission indicative of whether to include the information relating to the channel status in the feedback message.

In some embodiments, the decoding result identified by the terminal is indicative of a negative acknowledgement (NACK) that identifies an unsuccessful decoding of a downlink transmission, and wherein the downlink transmission is a transmission in PDSCH scheduled or activated by the first message.

In some embodiments, a first indication field of the first message includes a bit string with any bit reading a non-zero value that is indicative of a first type of trigger state, wherein the indication of the first type of trigger state triggers feedback the first type of information relating to the channel status.

In some embodiments, the method includes transmitting, by the wireless communication node, a radio resource control (RRC) message to the terminal, wherein the first type of trigger state is configured by the wireless communication node via the RRC message.

In some embodiments, a first indication field of the first message includes a bit string with any bit reading a non-zero value that is indicative of a second type of trigger state, wherein the indication of the second type of trigger state triggers the second type of information relating to the channel status.

In some embodiments, the method includes transmitting, by the wireless communication node, an RRC message to the terminal, wherein the second type of trigger state is configured by the wireless communication node via the RRC message.

In some embodiments, the indication for the terminal to transmit a feedback message to the wireless communication node includes a CSI measurement type, wherein the CSI measurement type includes at least one of a first type of triggering that indicates a first type of CSI measurement is to be performed and a second type of triggering that indicates a second type of CSI measurement is to be performed.

In some embodiments, if the first type of triggering is identified in the first message, the terminal is configured to prepare a first format for the information relating to the channel status, wherein the first format is included in the feedback message.

In some embodiments, if the second type of triggering is identified in the first message, the terminal prepares a second format for the information relating to the channel status, wherein the second format is included in the feedback message.

In some embodiments, the second format for CSI feedback includes at least one of: at least one sub-band channel quality indicator (CQI) for a first frequency domain scope, a wideband CQI for the first frequency domain scope, at least one difference value between the at least one sub-band CQI and a last value indicative of a CQI of a previous feedback for the first frequency domain scope, at least one difference value between the at least one sub-band CQI and a value in the first message indicative of the first frequency domain scope, and at least one difference value between the at least one sub-band CQI and the wideband CQI for the first frequency domain scope.

In some embodiments, the first frequency domain scope is determined at least one of: pre-defined, configured by the wireless communication node via RRC signaling, a frequency resource for a downlink transmission scheduled by the first message, a frequency resource for a downlink transmission activated by the first message, a frequency resource for a semi-persistent scheduling (SPS) physical downlink shared channel (PDSCH) transmission.

In some embodiments, the method includes transmitting, by the wireless communication node, an offset to the terminal that is indicative of a first field or a first starting bit to read in the first message of the one or more fields in the first message.

In some embodiments, the indication to feedback the information relating to the channel status includes the decoding result of the downlink transmission after a first number of repeats.

In some embodiments, the first number of repeats includes at least one of a value equaling one, a total number of repeats configured by the wireless communication node through RRC signaling, and a value in a scope ranging between 1 and the total number of repeats configured by the wireless communication node through RRC signaling.

Example Wireless System

Figure 3:
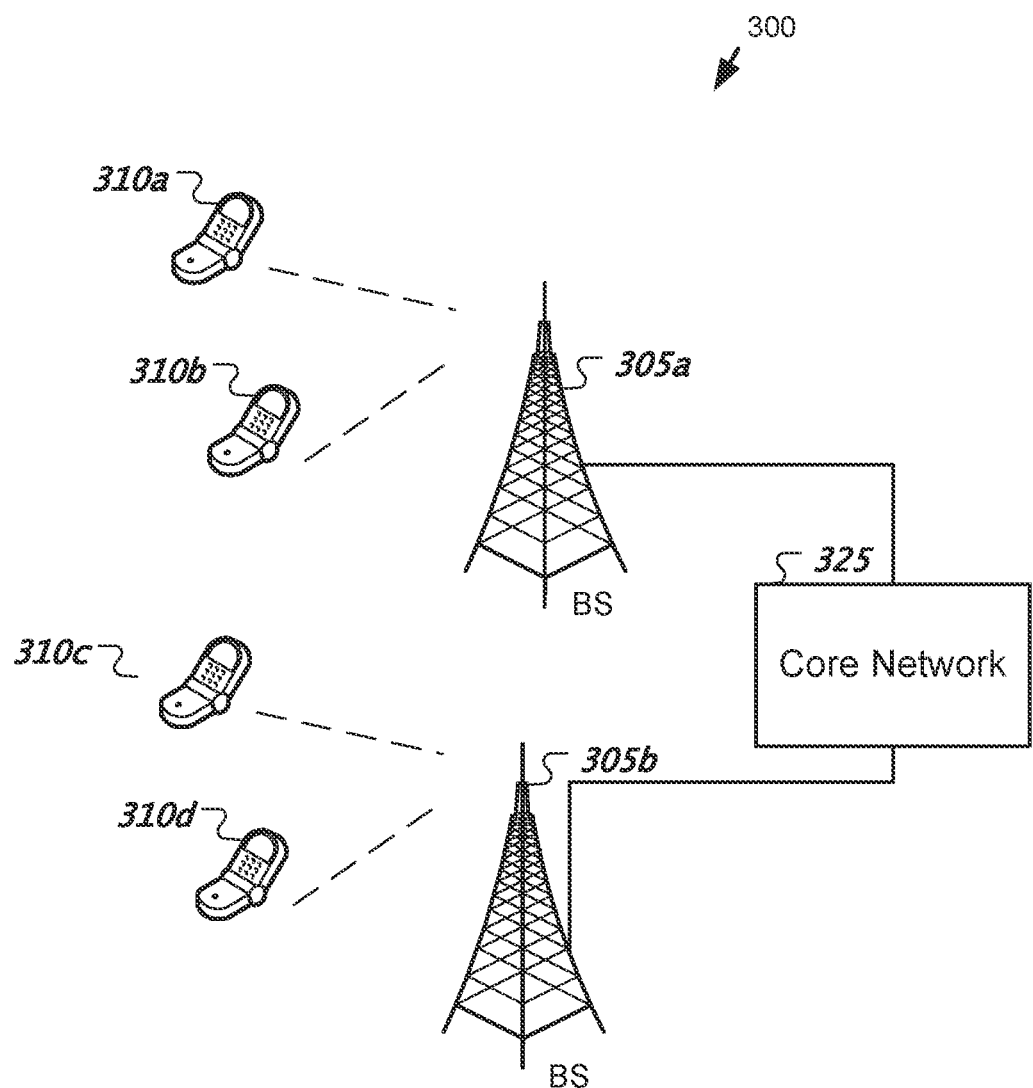
FIG. 3 shows an example of a wireless communication system where techniques in accordance with one or more embodiments of the present technology can be applied.

FIG. 3 shows an example of a wireless communication system where techniques in accordance with one or more embodiments of the present technology can be applied. A wireless communication system 300 can include one or more base stations (BSs) 305a, 305b, one or more wireless devices 310a, 310b, 310c, 310d, and a core network 325. A base station 305a, 305b can provide wireless service to wireless devices 310a, 310b, 310c and 310d in one or more wireless sectors. In some implementations, a base station 305a, 305b includes directional antennas to produce two or more directional beams to provide wireless coverage in different sectors.

The core network 325 can communicate with one or more base stations 305a, 305b. The core network 325 provides connectivity with other wireless communication systems and wired communication systems. The core network may include one or more service subscription databases to store information related to the subscribed wireless devices 310a, 310b, 310c, and 310d. A first base station 305a can provide wireless service based on a first radio access technology, whereas a second base station 305b can provide wireless service based on a second radio access technology. The base stations 305a and 305b may be co-located or may be separately installed in the field according to the deployment scenario. The wireless devices 310a, 310b, 310c, and 310d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 4:
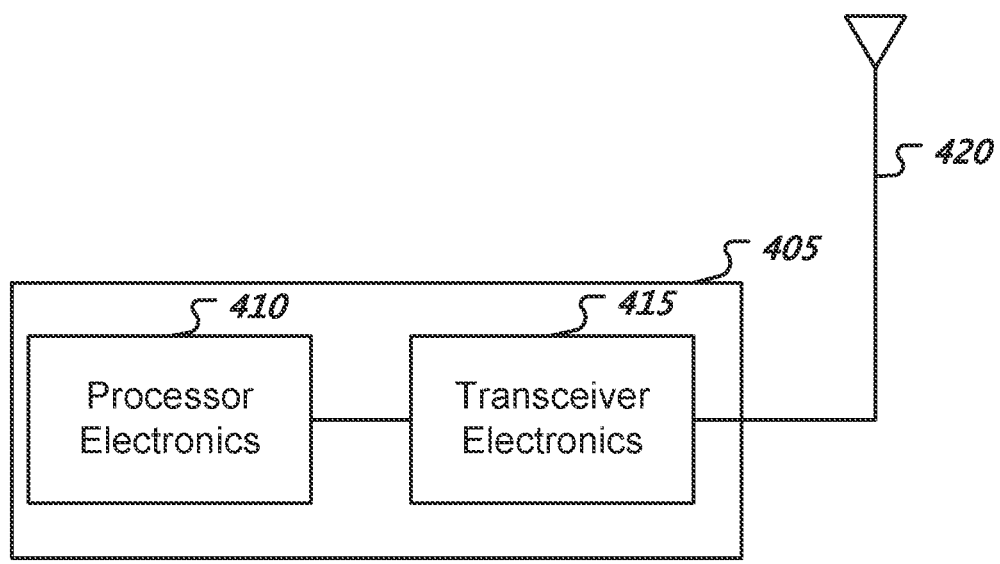
FIG. 4 is a block diagram representation of a portion of a hardware platform.

FIG. 4 is a block diagram representation of a portion of a hardware platform. A hardware platform 405 such as a network device or a base station or a wireless device (or UE) can include processor electronics 410 such as a microprocessor that implements one or more of the techniques presented in this document. The hardware platform 405 can include transceiver electronics 415 to send and/or receive wired or wireless signals over one or more communication interfaces such as antenna 420 or a wireline interface. The hardware platform 405 can implement other communication interfaces with defined protocols for transmitting and receiving data. The hardware platform 405 can include one or more memories (not explicitly shown) configured to store information such as data and/or instructions. In some implementations, the processor electronics 410 can include at least a portion of the transceiver electronics 415. In some embodiments, at least some of the disclosed techniques, modules or functions are implemented using the hardware platform 405.

Conclusion

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
receiving, by a terminal, a first message from a wireless communication node for triggering feedback messages for one or more terminals;
determining, by the terminal, whether the terminal is configured with one of a first triggering type or a second triggering type for feedback of channel state information based on receiving an offset from the wireless communication node that is indicative of a first field or a first starting bit to read in the first message of one or more fields in the first message;
performing, by the terminal, a measurement relating to a channel status; and
transmitting, by the terminal, a feedback message to the wireless communication node that includes information relating to the channel status based on determining that the one of the first triggering type or the second triggering type with which the terminal is configured is satisfied by the first message,
wherein the information relating to the channel status includes one of a first type of channel state information (CSI) feedback that is measured based on any of an aperiodic CSI-RS resource, periodic CSI-RS resource, or semi-persistent CSI-RS resource or a second type of CSI feedback that is measured based on any of a physical downlink shared channel (PDSCH), a periodic CSI-RS resource, or a semi-persistent CSI-RS resource, wherein the information includes (i) the first type of CSI feedback according to the terminal being configured with the first triggering type or (ii) the second type of CSI feedback according to the terminal being configured with the second triggering type, and
wherein, in case of the terminal being configured with the second triggering type, the second triggering type is satisfied by the first message scheduling or activating a downlink transmission and the terminal unsuccessfully decoding the downlink transmission.

2. The method of claim 1, wherein the terminal determines whether the first message satisfies the one of the first triggering type or the second triggering type based on any of a channel state information (CSI) request field, a cyclic redundancy check (CRC) scrambled by a first Radio Network Temporary Identifier (RNTI), a physical uplink control channel (PUCCH) resource indicator field, a new data indicator field, a redundancy version field, or a priority indicator field included in the first message.

3. The method of claim 1, wherein the first message includes any of a field that indicates a triggering type in the first message, a field in the first message that indicates a status of triggering the second type of information relating to the channel status, or a field in the first message that indicates a status of triggering the first type of information relating to the channel status.

4. The method of claim 1, further comprising:
determining, by the terminal, whether the first message includes an indication to trigger any of the first type of CSI feedback or the second type of CSI feedback.

5. The method of claim 1, wherein the terminal unsuccessfully decoding the downlink transmission results in a negative acknowledgement (NACK), and wherein the downlink transmission is a transmission in PDSCH scheduled or activated by the first message.

6. The method of claim 1, further comprising:
determining, by the terminal, that a first indication field of the first message includes a bit string with any bit reading a non-zero value, wherein the bit string with any bit reading a non-zero value of the first indication field is indicative of the first triggering type or the second triggering type, wherein the first indication field triggers feedback of the first type of information relating to the channel status or the second type of information relating to the channel status.

7. The method of claim 6, further comprising:
receiving, by the terminal, a radio resource control (RRC) message from the wireless communication node, wherein the first triggering type or the second triggering type is configured by the wireless communication node via the RRC message.

8. The method of claim 1, wherein the first message is a group-common physical downlink control channel (PDCCH) downlink control information.

9. The method of claim 1, wherein the second triggering type is satisfied further based on a final decoding result of a number of repetitions of the downlink transmission.

10. The method of claim 9, wherein the feedback message is transmitted at a time unit when a last repetition of the downlink transmission is received.

11. The method of claim 1, wherein the terminal determines whether the one of the first triggering type or the second triggering type is satisfied based on a priority indicated for the first message.

12. The method of claim 1, wherein the field indicated by the offset configures the first triggering type for the terminal based on having a value within a first range or configured the second triggering type for the terminal based on the value being within a second range.

13. A method for wireless communication, comprising:
configuring, by a wireless communication node, a terminal with one of a first triggering type or a second triggering type for feedback of channel state information;
transmitting, by a wireless communication node, a first message for triggering feedback messages for one or more terminals including the terminal, wherein the wireless communication node configures the terminal with the one of the first triggering type or the second triggering type based on transmitting an offset to the terminal that is indicative of a first field or a first starting bit to read in the first message of one or more fields in the first message; and receiving, by the wireless communication node, the feedback message from the terminal based on the terminal determining that the one of the first triggering type or the second triggering type is satisfied by the first message, the feedback message including information relating to a channel status, wherein the information relating to the channel status includes one of a first type of CSI feedback that is measured based on any of an aperiodic CSI-RS resource, periodic CSI-RS resource, or semi-persistent CSI-RS resource or a second type of channel state information that is measured based on any of a physical downlink shared channel (PDSCH), a periodic CSI-RS resource, or a semi-persistent CSI-RS resource, wherein the information includes (i) the first type of channel state information according to the terminal being configured with the first triggering type or (ii) the second type of channel state information according to the terminal being configured with the second triggering type, and wherein, in case of the terminal being configured with the second triggering type, the second triggering type is satisfied by the first message scheduling or activating a downlink transmission and the terminal unsuccessfully decoding the downlink transmission.

14. The method of claim 13, wherein the terminal determines whether the one of the first triggering type or the second triggering type is satisfied based on any of a channel state information (CSI) request field, a cyclic redundancy check (CRC) scrambled by a first Radio Network Temporary Identifier (RNTI), a physical uplink control channel (PUCCH) resource indicator field, a new data indicator field, a redundancy version field, or a priority indicator field included in the first message.

15. The method of claim 13, wherein a first indication field of the first message includes a bit string with any bit reading a non-zero value that is indicative of the first triggering type or the second triggering type, wherein the first indication field triggers the first type of CSI feedback or the second type of CSI feedback.

16. The method of claim 13, further comprising:
transmitting, by the wireless communication node, a radio resource control (RRC) message to the terminal, wherein the one of the first triggering type or the second triggering type is configured by the wireless communication node via the RRC message.

17. An apparatus for wireless communication comprising a processor and a memory storing instructions that, when executed by the processor, cause the apparatus to:
receive a first message from a wireless communication node for triggering feedback messages for one or more terminals;
determining whether the apparatus is configured with one of a first triggering type or a second triggering type for feedback of channel state information based on receiving an offset from the wireless communication node that is indicative of a first field or a first starting bit to read in the first message of one or more fields in the first message;
perform a measurement relating to a channel status; and
transmit a feedback message to the wireless communication node that includes information relating to the channel status based on determining that the one of the first triggering type or the second triggering type with which the terminal is configured is satisfied by the first message, wherein the information relating to the channel status includes one of a first type of CSI feedback that is measured based on any of an aperiodic CSI-RS resource, periodic CSI-RS resource, or semi-persistent CSI-RS resource or a second type of channel state information that is measured based on any of a physical downlink shared channel (PDSCH), a periodic CSI-RS resource, or a semi-persistent CSI-RS resource, wherein the information includes (i) the first type of CSI feedback according to the terminal being configured with the first triggering type or (ii) the second type of CSI feedback according to the terminal being configured with the second triggering type, and wherein, in case of the terminal being configured with the second triggering type, the second triggering type is satisfied by the first message scheduling or activating a downlink transmission and the terminal unsuccessfully decoding the downlink transmission.

18. An apparatus for wireless communication comprising a processor and a memory storing instructions that, when executed by the processor, cause the apparatus to:
configure a terminal with one of a first triggering type or a second triggering type for feedback of channel state information;
transmit a first message for triggering feedback messages for one or more terminals including the terminal, wherein the apparatus configures the terminal with the one of the first triggering type or the second triggering type based on transmitting an offset to the terminal that is indicative of a first field or a first starting bit to read in the first message of one or more fields in the first message; and
receive the feedback message from the terminal based on the terminal determining that the one of the first triggering type or the second triggering type is satisfied by the first message, the feedback message including information relating to a channel status, wherein the information relating to the channel status includes one of a first type of CSI feedback that is measured based on any of an aperiodic CSI-RS resource, periodic CSI-RS resource, or semi-persistent CSI-RS resource or a second type of channel state information that is measured based on any of a physical downlink shared channel (PDSCH), a periodic CSI-RS resource, or semi-persistent CSI-RS resource, wherein the information includes (i) the first type of CSI feedback according to the terminal being configured with the first triggering type or (ii) the second type of CSI feedback according to the terminal being configured with the second triggering type, and wherein, in case of the terminal being configured with the second triggering type, the second triggering type is satisfied by the first message scheduling or activating a downlink transmission and the terminal unsuccessfully decoding the downlink transmission.

* * * * *